(12) United States Patent
Welch et al.

(10) Patent No.: US 6,230,663 B1
(45) Date of Patent: May 15, 2001

(54) QUICK RELEASE LEASH ASSEMBLY

(76) Inventors: Steve L. Welch, 22881 Aspen St., Lake Forest, CA (US) 92360; Timothy L. Welch, 18549 Hawthorne St., Fountain Valley, CA (US) 92708

( * ) Notice: Subject to any disclaimer, the term of this patent is extended or adjusted under 35 U.S.C. 154(b) by 0 days.

(21) Appl. No.: 09/232,482

(22) Filed: Jan. 15, 1999

(51) Int. Cl.[7] ....................................................... A01K 1/08
(52) U.S. Cl. ............................................. 119/772; 119/776
(58) Field of Search ................................... 119/772, 774, 119/776, 780, 792, 795, 797, 798, 856; 70/2, 14, 28; 24/4, 20 R, 270

(56) References Cited

U.S. PATENT DOCUMENTS

| | | | |
|---|---|---|---|
| 794,563 | * 7/1905 | Stahlknecht | 119/776 |
| 4,903,638 | * 2/1990 | Lacey | 119/776 |
| 4,932,362 | * 6/1990 | Birchmire, III et al. | 119/772 |
| 5,588,398 | 12/1996 | Allen, II et al. | 119/822 |
| 5,806,468 | * 9/1998 | Ryder | 119/776 |

* cited by examiner

Primary Examiner—Charles T. Jordan
Assistant Examiner—Elizabeth Shaw
(74) Attorney, Agent, or Firm—Kit M. Stetina; Mark B. Garred; Stetina Brunda Garred & Brucker

(57) ABSTRACT

A quick release leash assembly for releasable attachment to an animal collar. The leash assembly comprises an elongate, flexible strap having opposed first and second ends. Attached to the second end of the strap is a latch mechanism which is releasably engagable to the animal collar. The latch mechanism has a latch member which is moveable between a locked position whereat the latch mechanism is maintainable in attachment to the animal collar, and a release position whereat the animal collar is detachable from the latch mechanism. Mechanically coupled to the latch mechanism is a release mechanism of the leash assembly which is operative to selectively move the latch member from the locked position to the release position subsequent to the application of a tensile force thereto.

12 Claims, 3 Drawing Sheets

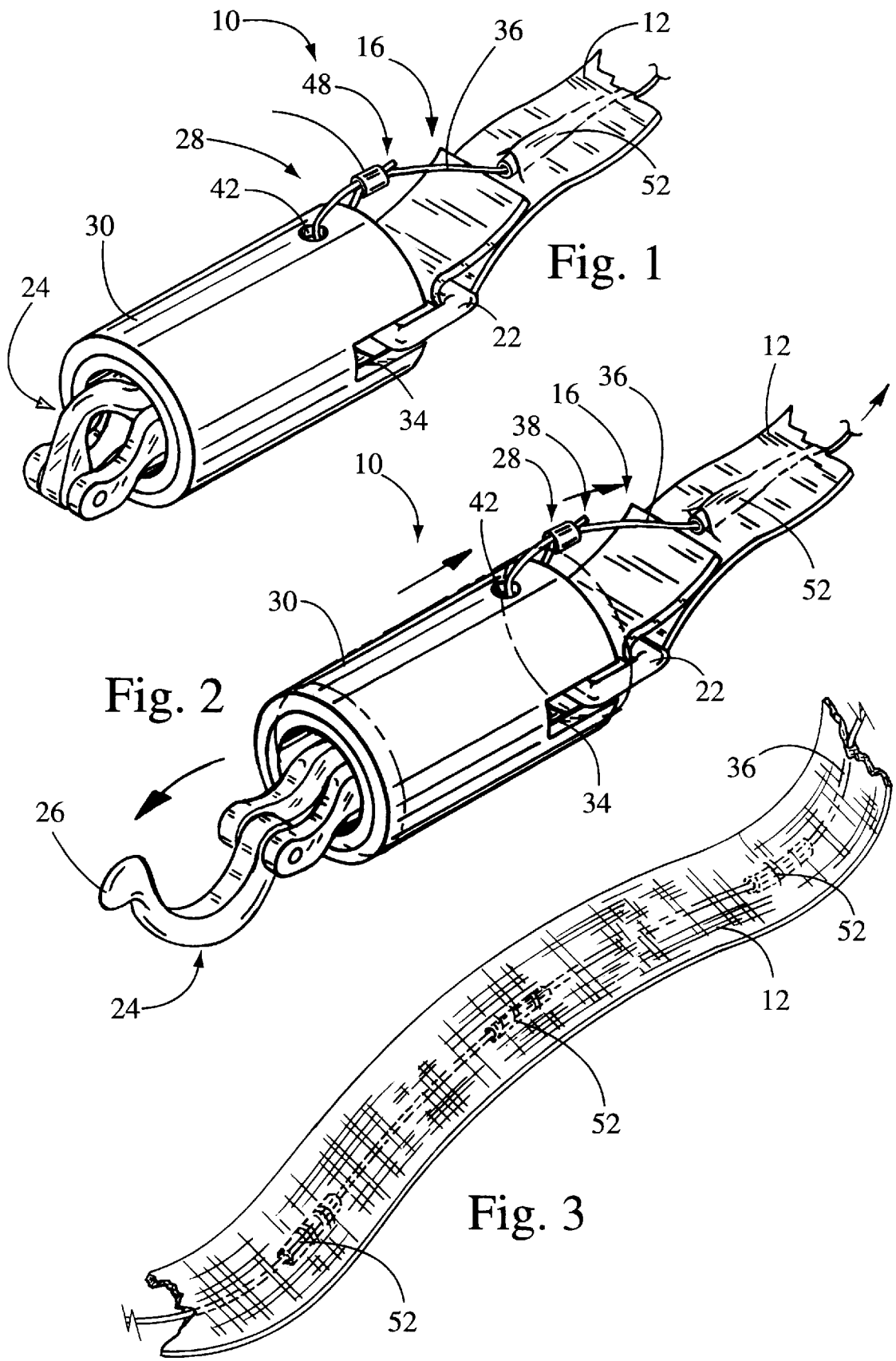

QUICK RELEASE LEASH ASSEMBLY

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to canine accessories, and more particularly to a quick release leash assembly particularly suited for use in relation to police dogs in the law enforcement field.

As is well known, it is a common practice for many state and local police and sheriff's departments to employ the use of dogs in relation to law enforcement activities. Typically, these "police dogs" are part of a canine unit of the law enforcement agency which also includes certain officers who have received extensive training in relation to the handling of the dogs and their effective use in relation to various law enforcement techniques. These techniques include drug sniffing and, more notably, the tracking and/or apprehension of criminal suspects or other individuals.

With regard to the use of dogs in relation to the tracking and/or apprehension of individuals, it is a common practice for the dog to be maintained on a leash which is held by an officer walking beside or behind the dog as it tracks the sought after individual. At certain times, such as when the individual comes into close range or during a foot race when the individual is in the plain sight of the officer and dog, it is desirable to release the leash from the collar of the dog so as to allow the dog to freely pursue of the individual at an increased speed or to directly, physically engage the individual. In view of the dog's training and resultant desire to engage the individual, it is often difficult for the officer to gain sufficient control of the dog as is needed to facilitate the manual release of the leash from the dog's collar. This difficulty is most commonly encountered when leashes of substantial length are being used with the dog, thus necessitating that the officer "pull" the dog a substantial distance to gain access to the dog's collar despite the resistance exerted by the dog in its attempt to run in the opposite direction. As will be recognized, this delay could even provide the sought after individual sufficient time to elude the dog and the officer.

The present invention addresses the deficiencies of prior art leashes when employed in the above-described scenario by providing a quick release leash assembly which is specifically adapted to allow an officer to disengage the leash assembly from the dog's collar from a location at the opposite end of the thereof, thus eliminating the need to gain direct access to the point of connection between the leash assembly and the dog's collar. Additionally, in the present quick release leash assembly, such disengagement is achievable almost instantaneously, without requiring any complicated or time consuming manipulations of various parts or components. These, and other advantages associated with the present invention, will be discussed in more detail below.

BRIEF SUMMARY OF THE INVENTION

In accordance with the present invention, there is provided a quick release leash assembly for releasable attachment or engagement to an animal collar, and in particular a dog collar. The present leash assembly is particularly suited for use in relation to police dogs, though those of ordinary skill in the art will recognize that it may also be used in relation to common household dogs and cats wearing a collar.

The leash assembly of the present invention comprises an elongate, flexible lead or strap which has opposed first and second ends and is preferably fabricated from a tube-type, flat nylon material. The strap may be fabricated to be of a length in the range of from about 6 feet to about 60 feet, and is preferably fabricated in length increments of 6 feet, 15 feet, 20 feet, 25 feet, 30 feet, 40 feet, 50 feet, and 60 feet. Attached to the second end of the strap is a latch mechanism of the leash assembly which is releasably engageable to the animal collar. The latch mechanism includes a latch member or hook member which is movable between a locked position whereat the latch mechanism is maintainable in attachment to the animal collar, and a release position whereat the animal collar is detachable from the latch mechanism. In addition to the latch member, the latch mechanism includes a body, with the latch member being reciprocally movable between its locked and release positions relative to the body. In the latch mechanism, the latch member is normally biased to its locked position.

In addition to the above-described components, the present leash assembly includes a release mechanism which is mechanically coupled to the latch mechanism and operative to selectively move the latch member from its locked position to its release position at such time when a tensile force is being applied to the latch mechanism, and in particular the latch member thereof. As will be recognized, the application of a tensile force to the latch member typically occurs when the leash assembly is attached to the collar of a dog or other animal and the movement of the dog or other animal is being resisted by the holder of the leash assembly.

The release mechanism comprises a tubular, generally cylindrical release member which is cooperatively engaged to the body of the latch mechanism. The release mechanism also includes an elongate cord having opposed proximal end distal ends, with the distal end of the cord being attached to the release member. Attached to the proximal end of the cord is a trigger pull or release handle, with the cord preferably being sized such that the release handle is disposed in relative close proximity to the first end of the strap. In the present leash assembly, the cord preferably extends within the interior of the strap, with the proximal end of the cord protruding from the strap in relative close proximity to the first end thereof, and the distal end of the cord protruding from the strap in relative close proximity to the second end thereof. The cord is itself preferably fabricated from a material selected from the group consisting of braided or twisted high tensile strength nylon line, braided metal line of at least 80 and preferably 90 pound test, coated metal line or wire of at least 80 and preferably 90 pound test, and coated metal cable. A preferred coating for the metal wire or cable is Teflon or polytetrafluoroethylene.

In addition to the above-described components, the leash assembly further comprises a stop member which is attached to the cord of the release mechanism in relative close proximity to the distal end thereof. The stop member is used to prevent a distal portion of the cord adjacent its distal end from being drawn into the strap. The stop member may comprise either a lead or nylon component having either a generally cylindrical or spherical configuration which is rigidly fixed to a prescribed location upon the cord. The stop member is typically only included on the cord for leash assemblies having strap lengths exceeding six feet. Also included in the present leash assembly is a plurality of a guide sleeves which are disposed within the interior of the strap in spaced relation to each other. Each of the guide sleeves has a tubular, generally cylindrical configuration, with the opposed ends thereof preferably being flared. The cord of the release mechanism is extended through the guide sleeves which provide a reinforcement function to prevent the cord from slicing through the strap.

In a first embodiment of the present leash assembly, the release member of the release mechanism is rigidly attached to the body of the latch mechanism. In a second embodiment of the present leash assembly, the release member, as well as the second end of the strap, are rotatably connected to the body of the latch mechanism. The rotatable connection of the release member to the body is preferably facilitated via a standard bearing. Advantageously, such rotatable connection assists in maintaining the release mechanism, and in particular the release handle thereof, in the same plane despite any movement of the dog or other animal with which the leash assembly is being used.

In accordance with a third embodiment of the present leash assembly, the release member of the release mechanism, rather than being cylindrically configured, comprises a strut member which is movably or slidably attached to a swivel member of the latch mechanism which is rotatably connected to the body thereof. The distal end of the cord of the release mechanism is attached to the strut member. In addition to the strut member, the release member in the third embodiment comprises a pair of elongate prong members which are attached to the strut member and extend along the body in opposed relation to each other so as to be separated by an interval of about 180 degrees. Each of the prong members has an inner end which is attached to the strut member and an arcuately contoured, inwardly turned or bent outer end which may either lightly contact or be spaced by a narrow gap from the outer surface of the body of the latch mechanism. The prong members, and in particular the outer ends thereof, are selectively engageable to a generally annular washer member of the latch mechanism which is attached to the body thereof to facilitate the movement of the latch member to its release position. By virtue of its rotatable connection to the swivel member, the body of the latch mechanism is rotatable relative to the release member.

Further in accordance with the present invention, there is provided a method of facilitating a quick release of a dog or other animal wearing a collar from the above-described leash assembly. The method comprises the initial step of attaching the latch mechanism to the collar. Thereafter, the first end of the strap and the release handle of the release mechanism are simultaneously grasped by the user of the leash assembly, such as a law enforcement officer. Thereafter, the detachment of the latch mechanism from the collar is facilitated by releasing the first end of the strap while maintaining a grasp on the release handle subsequent to the application of a tensile force to the latch mechanism. Because the release handle of the release mechanism remains in the grasp of the user, the release member of the release mechanism remains stationary when the first end of the strap is released or dropped, as does the body of the latch mechanism due to the attachment or engagement of the release member thereto. Though the release member and the body are maintained in stationary orientations, the release of the first end of the strap from the user's hand allows the latch member of the latch mechanism to overcome the biasing force normally exerted thereagainst and move outwardly relative to the body in view of the tensile force being applied thereto. As a result, the latch member is moved from its locked position to its release position, thereby allowing the collar to be detached therefrom.

BRIEF DESCRIPTION OF THE DRAWINGS

These, as well as other features of the present invention, will become more apparent upon reference to the drawings wherein:

FIG. 1 is a partial perspective view of a quick release leash assembly constructed in accordance with a first embodiment of the present invention;

FIG. 2 is a partial perspective view of the quick release leash assembly of the first embodiment, illustrating the manner in which various components thereof move to facilitate its disengagement from a dog collar;

FIG. 3 is a partial perspective view of the strap component of the quick release leash assembly shown in FIGS. 1 and 2;

DETAILED DESCRIPTION OF THE PREFERRED EMBODIMENTS

Figure 4:
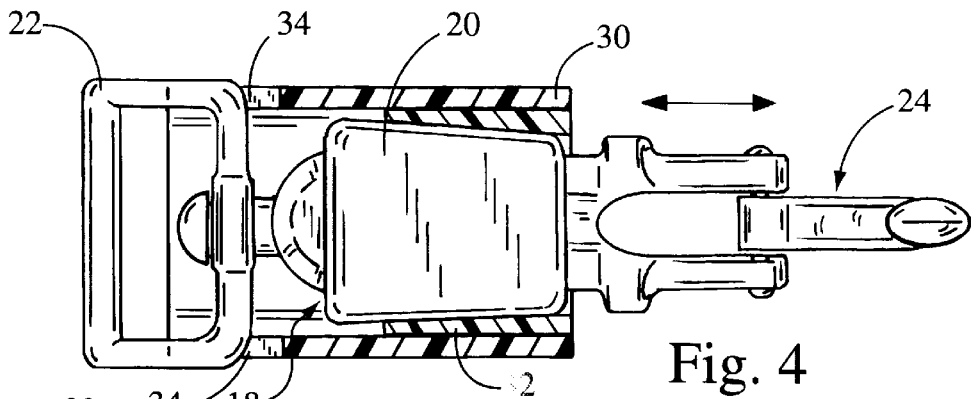
FIG. 4 is a partial cross-sectional view of the quick release leash assembly shown in FIGS. 1 and 2.

Referring now to the drawings wherein the showings are for purpose of illustrating preferred embodiments of the present invention only, and not for purposes of limiting the same, FIGS. 1 and 2 perspectively illustrate a portion of a quick release leash assembly 10 constructed in accordance with a first embodiment of the present invention. As indicated above, the leash assembly 10 is releasably attachable or engagable to an animal collar, and in particular a dog collar. Though being particularly suited for use in relation to police dogs, the leash assembly 10 may also be used in relation to common household dogs and cats wearing a collar.

Referring now to FIGS. 1–3, the leash assembly 10 comprises an elongate, flexible lead or strap 12 which defines a first end 14 and an opposed second end 16. The strap 12 is preferably fabricated from a tube-type, flat nylon material. Additionally, the strap 12 may be fabricated to be of a length in the range of from about 6 feet to about 60 feet, and is preferably fabricated in length increments of 6 feet, 15 feet, 20 feet, 25 feet, 30 feet, 40 feet, 50 feet, and 60 feet. Attached to the second end 16 of the strap 12 is a latch mechanism 18 of the leash assembly 10 which is releasably attachable or engageable to an animal collar.

Referring now to FIGS. 1, 2 and 4, in the leash assembly 10, the latch mechanism 18 comprises a body 20 which has a swivel member 22 rotatably connected to one end thereof. The attachment of the strap 12 to the latch mechanism 18 is facilitated by advancing the second end 16 of the strap 12 through the opening defined by the swivel member 22, and thereafter securing the second end 16 to the strap 12 itself in the manner best seen in FIGS. 1 and 2. The latch mechanism 18 further includes a hook member or latch member 24 which is movably attached to the end of the body 20 opposite that including the swivel member 22 rotatably connected thereto. As will be discussed in more detail below, the latch member 24 is reciprocally movable relative to the body 20 between a locked position (shown in FIG. 1) whereat the latch mechanism 18 is maintainable in attachment to the animal collar, and a release position (shown in FIG. 2) whereat the animal collar is detachable from the latch mechanism 18.

The latch member 24 is normally biased to its locked position by a biasing spring (not shown) which is disposed within the interior of the body 20. When the latch member 24 is in its locked position, a projection 26 formed on the distal end thereof is captured within the body 20, thereby causing the latch member 24 to assume the configuration shown in FIG. 1. The movement of the latch member 24 outwardly relative to the body 20 to its release position removes the projection 26 from within the body 20, thus allowing the latch member 24 to assume the configuration shown in FIG. 2. As will be recognized, in order for the latch member 24 to be moved from its locked position to its release position, a tensile force must be applied thereto in an amount sufficient to overcome the biasing force exerted thereagainst by the biasing spring within the interior of the body 20.

Referring now to FIGS. 1–4 and 6, the present leash assembly 10 further comprises a release mechanism 28 which is mechanically coupled to the latch mechanism 18 and operative to selectively move the latch member 24 from its locked position to its release position at such time when a tensile force is being applied to the latch mechanism 18, and in particular the latch member 24 thereof. As indicated above, the application of a tensile force to the latch member 24 typically occurs when the leash assembly 10 is attached to the collar of a dog or other animal, and the movement of the dog or other animal is being resisted by the user of the leash assembly 10.

In the leash assembly 10, the release mechanism 28 comprises a tubular, generally cylindrical release member 30 which is cooperatively engaged to the body 20 of the latch mechanism 18 in the manner shown in FIG. 4. In the first embodiment, such cooperative engagement is facilitated by an annular adaptor member 32 which defines a generally cylindrical outer surface and a tapered or sloped inner surface. As seen in FIG. 4, the slope of the inner surface of the adaptor member 32 is formed so as to be complementary to the slope of the outer surface of the body 20 of the latch mechanism 18. The adaptor member 32 is sized such that the diameter of the outer surface thereof is substantially equal to the diameter of the inner surface of the release member 30. The outer surface of the adaptor member 32 is preferably adhered to the inner surface of the release member 30, with the body 20 of the latch mechanism 18 itself being cooperatively engaged to the adaptor member 32. The adhesion between the adaptor member 32 and the release member 30 is preferably facilitated either through the use of an adhesive or via a sonic weld. The engagement between the body 20 and the adaptor member 32 is facilitated by the frictional interference between the complementary sloped surfaces thereof alone or in combination with an adhesive that may be applied to the outer surface of the body 20 prior to its insertion into the adaptor member 32. The adaptor member 32 is preferably oriented within the release member 30 such that the end thereof of reduced internal diameter is substantially flush with the end of the release member 30 disposed closest to the latch member 24 of the latch mechanism 18.

As seen in FIGS. 1 and 2, formed in the end of the release member 30 furthest from the latch member 24 is an opposed pair of slots 34 which are separated from each other by an interval of approximately 180 degrees. The slots 34 are sized and configured to accommodate a portion of the swivel member 22 of the latch mechanism 18 in the manner shown in FIGS. 1, 2 and 4. As will be recognized, the receipt of the swivel member 22 into the slots 34 of the release member 30 prevents the swivel member 22 and the strap 12 connected thereto from rotating relative to the release member 30.

Figure 6:
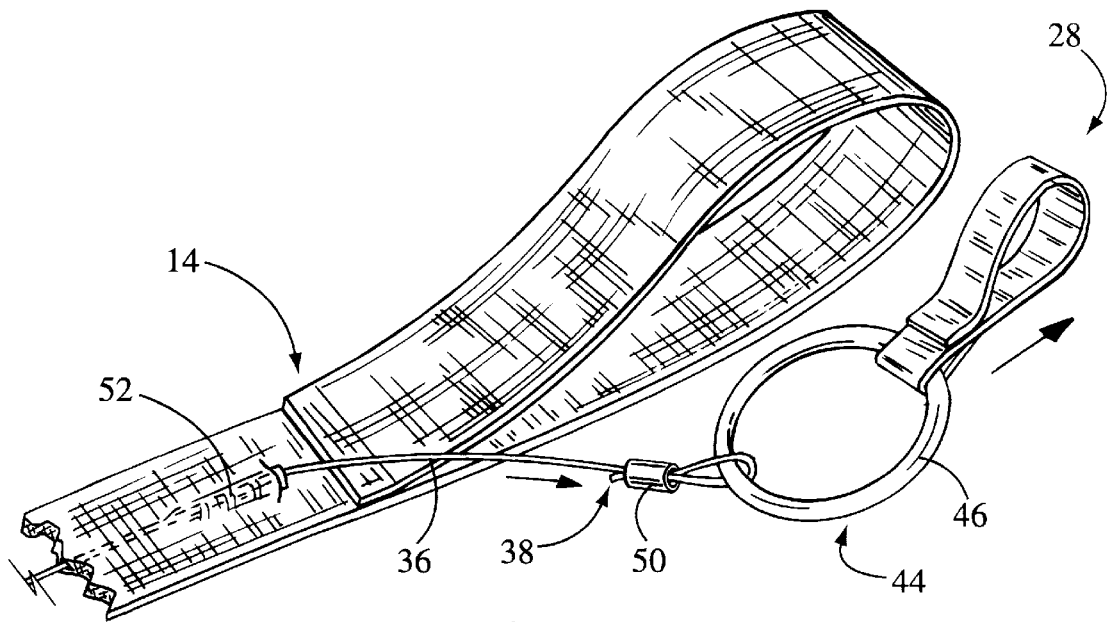
FIG. 6 is a partial perspective view of the release handle component of the quick release leash assembly constructed in accordance with either the first or second embodiments of the present invention.

The release mechanism 28 of the leash assembly 10 further comprises an elongate, flexible cord 36 which defines a proximal end 38 and an opposed distal end 40. As seen in FIGS. 1 and 2, the cord 36 is attached to the release member 30, with such attachment being facilitated by the advancement of the distal end 40 through an aperture 42 disposed within the release member 30 and thereafter securing the distal end 40 to the cord 36 itself. The aperture 42 which accommodates the cord 36 is preferably disposed intermediate the slots 34, i.e., is oriented at an interval of approximately 90 degrees from each slot 34. As seen in FIG. 6, attached to the opposite end of the cord 36 is a trigger pull or release handle 44 of the release mechanism 28. The attachment of the cord 36 to the release handle 44 is facilitated by the advancement of the proximal end 38 through a ring member 46 of the release handle 44 and thereafter securing the proximal end 38 to the cord 36 itself. The cord 36 is preferably sized such that the release handle 44 is disposed in relative close proximity to the first end 14 to the strap 12.

As seen in FIGS. 1–3 and 6, in the leash assembly 10, the cord 36 preferably extends within the interior of the strap 12, with a proximal portion of the cord 36 protruding from the strap 12 in relative close proximity to the first end 14 thereof, and a distal portion of the cord 36 protruding from the strap 12 in relative close proximity to the second end 16 thereof. The cord 36 is itself preferably fabricated from a material selected from the group consisting of braided or twisted high tensile strength nylon line, braided metal line of at least 80 and preferably about 90 pound test, coated metal line or wire of at least 80 and preferably about 90 pound test, and coated metal cable. A preferred coating for the metal wire or cable is Teflon or polytetrafluoroethylene.

As further seen in FIGS. 1 and 2, the leash assembly 10 further comprises a stop member 48 which is attached to the cord 36 of the release mechanism 28 in relative close proximity to the distal end 40 thereof. Indeed, in the leash assembly 10, the stop member 48 is itself used to secure the distal end 40 to the remainder of the cord 36. However, those of ordinary skill in the art will recognize that the stop member 48 may comprise a separate component which is attached to the cord 36 at a location proximal to the point at which the distal end 40 is secured thereto. The stop member 48 is used to prevent a distal portion of the cord 36 adjacent its distal end 40 from being drawn into the interior of the strap 12. The stop member 48 may comprise either a lead or nylon component having either a generally cylindrical configuration (as shown in FIGS. 1 and 2) or a spherical configuration. The stop member 48 is typically only included on the cord 36 in those instances when the length of the strap 12 of the leash assembly 10 exceeds 6 feet. In the leash assembly 10, a fastener member 50 similar to the stop member 48 is preferably used to secure the proximal end 38 of the cord 36 to the remainder thereof.

As seen in FIGS. 3 and 6, also included in the present leash assembly 10 are a plurality of guide sleeves 52 which are disposed within the interior of the strap 12 in spaced relation to each other. Each of the guide sleeves 52 has a tubular, generally cylindrical configuration, and is provided in a length of about 1 to 2 inches. The preferred spacing between the guide sleeves 52 within the strap 12 is preferably in the range of from about 3 feet to about 5 feet. Additionally, the opposed ends of each of the guide sleeves 52 are preferably formed to have an outwardly flared configuration. In the leash assembly 10, the cord 36 of the release mechanism 28 extends through the guide sleeves 52 which provide a reinforcement function to prevent the cord 36 from slicing through the strap 12. The guide sleeves 52 are preferably oriented along the axis of the strap 12, and maintained in prescribed positions therein through the use of stitching. Additionally, a pair of guide sleeves 52 are preferably included in the strap 12 at those locations whereat the opposed end portions of the cord 36 protrude therefrom, as seen in FIGS. 1, 2 and 6.

Figure 5:
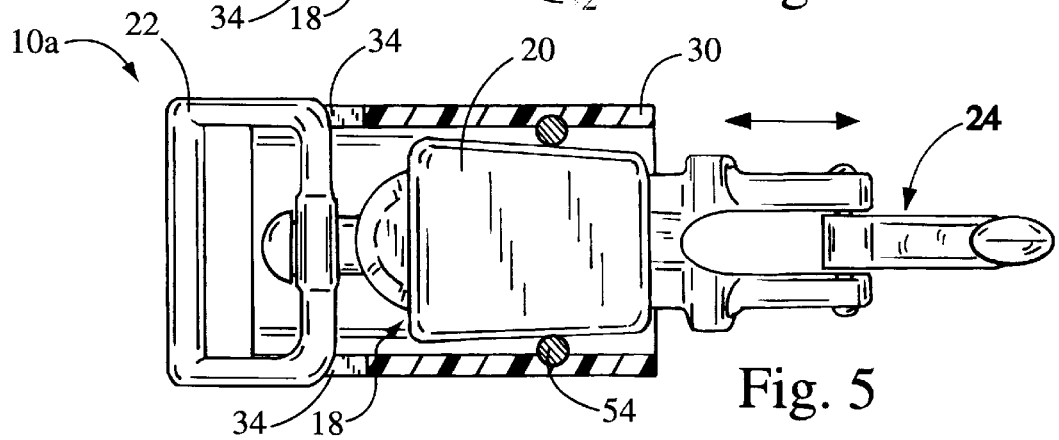
FIG. 5 is a partial cross-sectional view similar to FIG. 4 of a quick release leash assembly constructed in accordance with a second embodiment of the present invention.

Referring now to FIG. 5, there is depicted a leash assembly 10a constructed in accordance with a second embodiment of the present invention. The leash assembly 10a is identical to the previously described leash assembly 10, except that the release member 30 of the release mechanism 28 is not rigidly attached to the body 20 of the latch mechanism 18 as in the leash assembly 10, but rather is rotatably connected thereto. In this respect, in the leash assembly 10a, the above-described adaptor member 32 is eliminated, and replaced with a bearing 54 which facilitates the rotatable connection of the release member 30 to the body 20. As seen in FIG. 5, the annular bearing 54 extends about the inner surface of the release member 30, with the body 20 being inserted thereinto and rigidly maintained therewithin. Advantageously, such rotatable connection assists in maintaining the release mechanism 28 of the leash assembly 10a, and in particular the release handle 44 thereof, in the same plane despite any movement of the dog or other animal with which the leash assembly 10a is being used. Though the body 20 in the leash assembly 10a may rotate within the release member 30, the strap 12 is not twisted due to its connection to the swivel 22 which is itself rotatably connected to the body 20.

Figure 7:
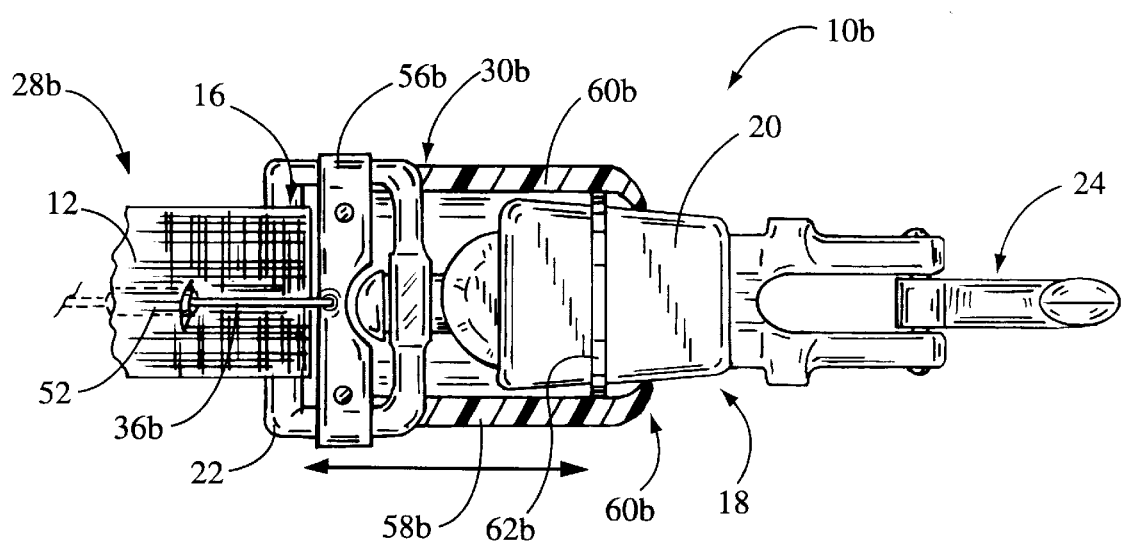
FIG. 7 is a partial cross-sectional view similar to FIGS. 4 and 5 of a quick release leash assembly constructed in accordance with a third embodiment of the present invention.

Referring now to FIG. 7, there is depicted a leash assembly 10b constructed in accordance with a third embodiment of the present invention. The leash assembly 10b differs from the previously described leash assembly 10 of the first embodiment due to the inclusion therein of an alternatively configured release member 30b in the release mechanism 28b thereof. More particularly, in the leash assembly 10b, the release member 30b comprises an elongate strut member 56b which is movably or slidably attached to the swivel member 22 of the latch mechanism 18. In the release mechanism 28b, the distal end of the cord 36b thereof is attached to the approximate center of the strut member 56b. In addition to the strut member 56b, the release member 30b comprises an identically configured pair of elongate prong members 58b which are attached to the strut member 56b and extend along the body 20 of the latch mechanism 18 in generally opposed relation to each other, i.e., at an interval of approximately 180 degrees.

In the release member 30b, each of the prong members 58b has an inner end which is attached to the strut member 56b, and an arcuately contoured, inwardly turned or bent outer end 60b. The outer ends 60b of the prong members 58b are selectively engageable to a generally annular washer member 62b which, in the leash assembly 10b, comprises a portion of the latch mechanism 18 and is rigidly attached to or affixed to the body 20 thereof. The peripheral edge of the washer member 62b may be in light contact with the prong members 58b or separated therefrom by a slight, narrow gap. Similarly, the outer ends 60b of the prong members 58b may be in light contact with the outer surface of the body 20, or alternatively separated therefrom by a slight, narrow gap. Due to its rotatable connection to the swivel member 22, the body 20 of the latch mechanism 18 is rotatable relative to the release member 30b.

Having thus described the components of the leash assembly 10, 10a, 10b, the preferred method of using the same to facilitate the quick release of a dog or other animal wearing a collar will now be described with reference to FIGS. 1–6. The initial step of the method comprises attaching the latch mechanism 18 of the leash assembly 10, 10a to the collar being worn by the dog or other animal. As will be recognized, in order for such attachment to occur, the latch member 24 must be in its release position as shown in FIG. 2. The latch member 24 is moved to its release position by grasping the same with one hand and pulling it outwardly from within the release member 30 which is grasped with the other hand. After the latch member 24 has been extended through the animal collar, the release thereof facilitates its spring biased return to the locked position.

Subsequent to the releasable attachment or engagement of the latch mechanism 18 to the collar in the above-described manner, the first end of the strap 12 and release handle 44 of the release mechanism 28 are simultaneously grasped by the user of the leash assembly 10, 10a. After a tensile force has been applied to the latch member 24 as occurs when a dog or other animal is attempting to move away from the leash user (i.e., the leash assembly 10, 10a is "stretched" between the dog or other animal and the user), the detachment of the latch mechanism 18 from the collar is facilitated by releasing or dropping the first end 14 of the strap 12 while maintaining a grasp on the release handle 44. Because the release handle 44 of the release mechanism 28 remains in the grasp of the user, the release member 30 remains stationary when the first end 14 of the strap 12 is dropped, as does the body 20 of the latch mechanism 18 due to the attachment of the release member 30 thereto. Though the release member 30 and the body 20 are maintained in stationary orientations, the release of the first end 14 of the strap 12 from the user's hand allows the latch member 24 of the latch mechanism 18 to overcome the biasing force normally exerted thereagainst and move outwardly relative to the body 20 in view of the tensile force being applied thereto. As a result, the latch member 24 is moved from its locked position to its release position, thereby allowing the collar to be detached therefrom. As such, the leash assembly 10, 10a may be disengaged from the collar almost instantaneously, without requiring any complicated or time consuming manipulations of various parts or components, or direct access to its point of connection to the collar.

The method of using the leash assembly 10b is the same as previously described in relation to the leash assembly 10, 10a, except that the leash assembly 10b functions slightly differently when the first end 14 of the strap 12 is dropped and the user's grasp is maintained on the release handle of the release mechanism 28b. In the leash assembly 10b, the latch member 24 of the latch mechanism 18 is moved to its release position by grasping the same with one hand and pulling it outwardly relative to the release member 30b which engages the washer member 62b of the latch mechanism 18. When the first end 14 of the strap 12 is dropped, the release member 30b remains stationary due to the attachment of the cord 36b thereto and the release handle of the release mechanism 28b remaining in the grasp of the user. With the release member 30b being maintained in a stationary orientation, the body 20 of the latch mechanism 18 can move slightly forwardly relative thereto due to the slidable attachment of the swivel member 22 of the latch mechanism 18 to the strut member 56b of the release member 30b. However, the forward movement of the body 20 is stopped upon the engagement of the outer ends 60b of the prong members 58b to the washer member 62b. Due to the tensile force exerted thereupon, the latch member 24 continues to move forwardly despite the movement of the body 20 being stopped, thus overcoming the biasing force normally exerted thereagainst and resulting in the outward movement thereof relative to the body 20. Thus, the latch member 24 is moved from its locked position to its release position, thereby allowing the collar to be detached therefrom. As such, the leash assembly 10b is also disengaged from the collar almost instantaneously, without requiring any complicated or time consuming manipulations of various parts or components. The rotatability of the body 20 relative to the release member 30b prevents any twisting of the cord 36b and strap 12 of the leash assembly 10b. Additionally, the arcuate contours of the outer ends 60b of the prong members 58b allows brush, branches, or other obstructions to easily pass over the release member 30b, thus mitigating against the inadvertent movement of the latch member 24 to its release position.

Additional modifications and improvements of the present invention may also be apparent to those of ordinary skill in the art. Thus, the particular combination of parts described and illustrated herein is intended to represent only certain embodiment of the present invention, and is not intended to serve as limitations of alternative devices within the spirit and scope of the invention.

What is claimed is:

1. A quick release leash assembly for releasable attachment to an animal collar, the leash assembly comprising:
   an elongate, flexible strap having opposed first and second ends;
   a latch mechanism attached to the second end of the strap and releasably engagable to the animal collar, the latch mechanism having:
      a body having the second end of the strap rotatably connected thereto; and
      a latch member which is reciprocally movable relative to the body between a locked position whereat the latch mechanism is maintainable in attachment to the animal collar and a release position whereat the animal collar is detachable from the latch mechanism, the latch member normally being biased to the locked position; and
   a release mechanism mechanically coupled to the latch mechanism and operative to selectively move the latch member from the locked position to the release position subsequent to the application of a tensile force thereto, the release mechanism comprising:
      a release member rotatable connected to the body of the latch mechanism via a bearing;
      an elongate cord having opposed proximal and distal ends the distal end of the cord being attached to the release member; and
      a release handle attached to the proximal end of the cord;
      the cord being sized such that the release handle is disposed in relative close proximity to the first end of the strap.

2. The leash assembly of claim 1 wherein the cord extends within the strap, with the proximal end of the cord protruding from the strap in relative close proximity to the first end thereof and the distal end of the cord protruding from the strap in relative close proximity to the second end thereof.

3. The leash assembly of claim 2 wherein the strap is fabricated from a tube-type flat nylon material.

4. The leash assembly of claim 2 wherein the cord is fabricated from a material selected from the group consisting of:
   braided high tensile strength nylon line;
   twisted high tensile strength nylon line;
   braided metal line of at least 80 pound test;
   coated metal line of at least 80 pound test; and
   coated metal cable.

5. The leash assembly of claim 2 further comprising a stop member attached to the cord in relative close proximity to the distal end thereof for preventing a distal portion of the cord adjacent the distal end from being drawn into the strap.

6. The leash assembly of claim 2 further comprising a plurality of guide sleeves disposed within the strap in spaced relation to each other, the cord being extended rough the guide sleeves.

7. The leash assembly of claim 1 wherein the strap is fabricated to be of a length in the range of from about 6 feet to about 60 feet.

8. The leash assembly of claim 1 wherein the latch mechanism further includes a washer member attached to the body thereof, the prong members being selectively engageable to the washer member.

9. The leash assembly of claim 8 wherein each of the prong members has an inner end which is attached to the strut member and an arcuately contoured, inwardly turned outer end which is selectively engageable to the washer member.

10. The leash assembly of claim 8 wherein the body of the latch mechanism is rotatable relative to the release member.

11. A quick release leash assembly for releasable attachment to an animal collar, the leash assembly comprising:
   an elongate, flexible strap having opposed first and second ends;
   a latch mechanism attached to the second end of the strap and releasably engagable to the animal collar, the latch mechanism comprising:
      a body;
      a swivel member rotatably connected to the body; and
      a latch member which is reciprocally movable relative to the body between a locked position whereat the latch mechanism is maintainable in attachment to the animal collar and a release position whereat the animal collar is detachable from the latch mechanism, the latch member normally being biased to the locked position; and
   a release mechanism mechanically coupled to the latch mechanism and operative to selectively move the latch member from the locked position to the release position subsequent to the application of a tensile force thereto, the release mechanism comprising:
      a release member having a strut member moveably attached to the swivel member and a pair of prong members attached to the strut member and extending along the body in opposed relation to each other, the prong members being selectively engagable to the body to facilitate the movement of the latch member to the release position;
      an elongate cord having opposed proximal and distal ends, the distal end of the cord being attached to the strut member; and
      a release handle attached to the proximal end of the cord;
      the cord being sized such that the release handle is disposed in relative close proximity to the first end of the strap.

12. A quick release leash assembly for releasable attachment to an animal collar, the leash assembly comprising:
- an elongate, flexible strap having opposed first and second ends;
- a latch mechanism attached to the second end of the strap and releasably engagable to the animal collar, the latch mechanism comprising:
  - a body having the second end of the strap rotatably connected thereto; and
  - a latch member which is reciprocally movable relative to the body between a locked position whereat the latch mechanism is maintainable in attachment to the animal collar and a release position whereat the animal collar is detachable from the latch mechanism, the latch member normally being biased to the locked position; and
- a release mechanism mechanically coupled to the latch mechanism and operative to selectively move the latch member from the locked position to the release position subsequent to the application of a tensile force thereto, the release mechanism comprising:
  - a release member rotatably connected to the body of the latch mechanism;
  - an elongate cord having opposed proximal and distal ends, the distal end of the cord being attached to the release member; and
  - a release handle attached to the proximal end of the cord;
  - the cord being sized such that the release handle is disposed in relative close proximity to the first end of the strap.

\* \* \* \* \*